United States Patent
Cheng et al.

(10) Patent No.: US 6,749,980 B2
(45) Date of Patent: Jun. 15, 2004

(54) TONER PROCESSES

(75) Inventors: Chieh-Min Cheng, Rochester, NY (US); Allan K. Chen, Oakville (CA)

(73) Assignee: Xerox Corporation, Stamford, CT (US)

(*) Notice: Subject to any disclaimer, the term of this patent is extended or adjusted under 35 U.S.C. 154(b) by 136 days.

(21) Appl. No.: 10/152,369

(22) Filed: May 20, 2002

(65) Prior Publication Data

US 2003/0215733 A1 Nov. 20, 2003

(51) Int. Cl.$^7$ .................................................. G03G 5/00
(52) U.S. Cl. ................................................. 430/137.14
(58) Field of Search ..................................... 430/137.14

(56) References Cited

U.S. PATENT DOCUMENTS

| | | | |
|---|---|---|---|
| 4,558,108 A | 12/1985 | Alexandru et al. | 526/340 |
| 4,797,339 A | 1/1989 | Maruyama et al. | 430/109 |
| 4,983,488 A | 1/1991 | Tan et al. | 430/137 |
| 4,996,127 A | 2/1991 | Hasegawa et al. | 430/109 |
| 5,278,020 A | 1/1994 | Grushkin et al. | 430/137 |
| 5,290,654 A | 3/1994 | Sacripante et al. | 430/137 |
| 5,308,734 A | 5/1994 | Sacripante et al. | 430/137 |
| 5,344,738 A | 9/1994 | Kmiecik-Lawrynowicz et al. | 430/137 |
| 5,370,963 A | 12/1994 | Patel et al. | 430/137 |
| 5,403,693 A | 4/1995 | Patel et al. | 430/137 |
| 5,418,108 A | 5/1995 | Kmiecik-Lawrynowicz et al. | 430/137 |
| 5,919,595 A | 7/1999 | Mychajlowskij et al. | 430/137 |
| 5,925,488 A | 7/1999 | Patel et al. | 430/137 |
| 5,977,210 A | 11/1999 | Patel et al. | 523/161 |
| 5,994,020 A | 11/1999 | Patel et al. | 430/137 |
| 6,108,506 A * | 8/2000 | Umetani | 430/137.19 |
| 6,132,924 A | 10/2000 | Patel et al. | 430/137 |
| 6,268,102 B1 | 7/2001 | Hopper et al. | 430/137.14 |

* cited by examiner

Primary Examiner—Mark A. Chapman
(74) Attorney, Agent, or Firm—E. O. Palazzo

(57) ABSTRACT

A process for the preparation of toner comprising generating a latex emulsion of resin, water, and an ionic surfactant, and a colorant dispersion of a surface modified colorant and water, and wherein the latex emulsion is blended with the surface modified colorant dispersion; heating the resulting mixture below or equal to about the glass transition temperature (Tg) of the latex resin to form aggregates; optionally adding a second latex comprised of submicron resin particles suspended in an aqueous phase resulting in a shell or coating wherein the shell is optionally of from about 0.1 to about 1 micron in thickness, and wherein optionally the shell coating is contained on 100 percent of the aggregates; heating the resulting aggregate suspension above about the Tg of the latex resin; and optionally isolating the toner.

34 Claims, No Drawings

TONER PROCESSES

PENDING APPLICATIONS AND PATENTS

In application U.S. Ser. No. 922,437, now abandoned, filed Sep. 2, 1997, the disclosure of which is totally incorporated herein by reference, there is illustrated, for example, a process for the preparation of toner comprising (i) aggregating with a metal complex or metal ion a colorant dispersion with a latex emulsion and optional additives to form aggregates;

(ii) coalescing or fusing the aggregates; and optionally (iii) isolating, washing, and drying the toner.

In U.S. Pat. No. 6,132,924, the disclosure of which is totally incorporated herein by reference, there is illustrated a process for the preparation of toner comprising mixing a colorant, a latex, and two coagulants, followed by aggregation and coalescence, and wherein one of the coagulants may be polyaluminum chloride.

In U.S. Pat. No. 6,268,102, the disclosure of which is totally incorporated herein by reference, there is illustrated a process for the preparation of toner comprising mixing a colorant, a latex, and two coagulants, followed by aggregation and coalescence, and wherein one of the coagulants is a polyaluminum sulfosilicate.

Illustrated in U.S. Pat. No. 5,994,020, the disclosure of which is totally incorporated herein by reference, are toner preparation processes, and more specifically, a process for the preparation of toner comprising:

(i) preparing, or providing a colorant dispersion;

(ii) preparing, or providing a functionalized wax dispersion comprised of a functionalized wax contained in a dispersant mixture comprised of a nonionic surfactant, an ionic surfactant, or mixtures thereof;

(iii) shearing the resulting mixture of the functionalized wax dispersion (ii) and the colorant dispersion (i) with a latex or emulsion blend comprised of resin contained in a mixture of an anionic surfactant and a nonionic surfactant;

(iv) heating the resulting sheared blend of (iii) below about the glass transition temperature (Tg) of the resin particles;

(v) optionally adding additional anionic surfactant to the resulting aggregated suspension of (iv) to prevent, or minimize additional particle growth of the resulting electrostatically bound toner size aggregates during coalescence (iv);

(vi) heating the resulting mixture of (v) above about the Tg of the resin; and optionally separating the toner particles; and a process for the preparation of toner comprising blending a latex emulsion containing resin, colorant, and a polymeric additive; adding an acid to achieve a pH of about 2 to about 4 for the resulting mixture; heating at a temperature about equal to, or about below the glass transition temperature (Tg) of the latex resin; optionally adding an ionic surfactant stabilizer; heating at a temperature about equal to, or about above about the Tg of the latex resin; and optionally cooling, isolating, washing, and drying the toner.

The appropriate components and processes of the above recited copending applications and patents may be selected for the processes of the present invention in embodiments thereof.

BACKGROUND

The present invention is generally directed to toner processes, and more specifically, to chemical processes which involve the aggregation and fusion of latex, colorant like pigment, or dye, and additive particles into toner particles, and wherein there is selected a surfactant free, or substantially surfactant free colorant dispersion, and which dispersion is comprised of, for example, a surface modified colorant dispersed in water. In embodiments the surface modified colorant, like pigment, includes a colorant containing at least one attached hydrophilic organic segment or group, and which group can be, for example, a carboxylic acid, a sulfonic acid, a sulfophenylaryl like sulfophenyl, a carboxy aryl, like carboxy phenyl, a sulfonamide, and the like. After mixing the colorant dispersion with a latex, the resulting blend is optionally stirred and heated to a temperature below the resin Tg, resulting in aggregates, followed by heating above the latex resin Tg to fuse the colorant and latex resin, thereafter isolating the toner product wherein there are generated toner compositions with, for example, a volume average diameter of from about 1 micron to about 25 microns, and more specifically, from about 2 microns to about 12 microns, and a narrow particle size distribution of, for example, from about 1.10 to about 1.33, and more specifically, a size distribution of about 1.11 to about 1.25, the size and size distribution being measured by a Coulter Counter without the need to resort to conventional pulverization and classification methods. Furthermore, in embodiments there can be enabled minimum washings, for example about 2 to about 4 washings to provide a suitable toner triboelectrical charge such as greater than about 20 $\mu$C/g at 20 percent RH. The toners generated can be selected for known electrophotographic imaging and printing processes, including digital color processes. More specifically, the toners generated with the processes illustrated herein are especially useful for imaging processes, especially xerographic processes, which usually prefer a toner transfer efficiency. Also, the toners obtained with the processes illustrated herein can be selected for digital imaging systems, printing processes, and color processes wherein images with high resolution and excellent image uniformity result.

In embodiments of the present invention an organic chelating may be utilized to freeze or stabilize the aggregates particle size during coalescence in the presence of a base of, for example, sodium hydroxide.

REFERENCES

In xerographic systems, especially color systems, small sized toners of from about 2 to about 8 microns can be important to the achievement of high image quality for process color applications. It may also be important to have a low image pile height to eliminate, or minimize image feel and avoid paper curling after fusing. Paper curling can be particularly pronounced in xerographic color processes primarily because of the presence of relatively high toner coverage as a result of the application of three to four color toners. During the fusing step, moisture escapes from the paper due to high fusing temperatures of from about 120° C. to about 200° C. In the situation wherein only one layer of toner is selected, such as in one color black or highlight color xerographic applications, the amount of moisture driven off during fusing can be reabsorbed by the paper and the resulting print remains relatively flat with minimal paper curl. In process color where toner coverage is high, the relatively thick toner plastic covering on the paper can inhibit the paper from reabsorbing the moisture, and cause substantial paper curling. These and other imaging shortfalls and problems are avoided or minimized with the toners and processes of the present invention.

Also, it may be desirable to select certain toner particle sizes, such as from about 2 to about 10 microns, with a high colorant, especially pigment loading, such as from about 4 to about 15 percent by weight of toner, so that the mass of toner necessary for attaining the desired optical density and color gamut can be significantly reduced to eliminate or minimize paper curl. Lower toner mass also ensures the achievement of image uniformity. However, higher pigment loadings, for example, of about 10 to about 20 percent by weight of toner may adversely affect the charging behavior of toners. For example, the charge levels may be too low for proper toner development or the charge distributions may be too wide and toners of wrong charge polarity may be present. Furthermore, higher pigment loading may also result in the sensitivity of charging behavior to charges in environmental conditions such as temperature and humidity. Toners prepared in accordance with the processes of the present invention minimize, or avoid these disadvantages.

There is illustrated in U.S. Pat. No. 4,996,127, the disclosure of which is totally incorporated herein by reference, a toner of associated particles of secondary particles comprising primary particles of a polymer having acidic or basic polar groups and a coloring agent. The polymers selected for the toners of the '127 patent can be prepared by an emulsion polymerization method, see for example columns 4 and 5 of this patent. In column 7 of this '127 patent, it is indicated that the toner can be prepared by mixing the required amount of coloring agent and optional charge additive with an emulsion of the polymer having an acidic or basic polar group obtained by emulsion polymerization. In U.S. Pat. No. 4,983,488, the disclosure of which is totally incorporated herein by reference, there is disclosed a process for the preparation of toners by the polymerization of a polymerizable monomer dispersed by emulsification in the presence of a colorant and/or a magnetic powder to prepare a principal resin component and then effecting coagulation of the resulting polymerization liquid in such a manner that the particles in the liquid after coagulation have diameters suitable for a toner. It is indicated in column 9 of this patent that coagulated particles of 1 to 100, and particularly 3 to 70 microns, are obtained. This process results, it is believed, in the formation of particles with a wide particle size distribution. In U.S. Pat. No. 4,797,339, the disclosure of which is totally incorporated herein by reference, there is illustrated a process for the preparation of toners by resin emulsion polymerization, wherein similar to the '127 patent certain polar resins are selected; and U.S. Pat. No. 4,558,108, the disclosure of which is totally incorporated herein by reference, discloses a process for the preparation of a copolymer of styrene and butadiene by suspension polymerization processes.

Emulsion/aggregation/coalescence processes for the preparation of toners are illustrated in a number of Xerox Corporation patents, the disclosures of each of which are totally incorporated herein by reference, such as U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797; and also of interest may be U.S. Pat. Nos. 5,348,832; 5,405,728; 5,366,841; 5,496,676; 5,527,658; 5,585,215; 5,650,255; 5,650,256; 5,501,935; 5,723,253; 5,744,520; 5,763,133; 5,766,818; 5,747,215; 5,827,633; 5,853,944; 5,804,349; 5,840,462; 5,869,215; 5,863,698; 5,902,710; 5,910,387; 5,916,725; 5,919,595; 5,925,488, and 5,977,210. The appropriate components and processes of the above Xerox Corporation patents can be selected for the processes of the present invention in embodiments thereof.

SUMMARY

It is a feature of the present invention to provide toner processes with many of the advantages illustrated herein, which advantages include, for example, less washing and thus a cost savings as compared to a number of known emulsion/aggregation toner processes, excellent projection efficiencies for the developed images.

A further feature of the present invention is to provide a toner with high projection efficiency, such as from about 80 to about 95, and more specifically from about 85 to about 95 percent efficiency as measured by the Match Scan II spectrophotometer available from Milton-Roy, and which toner can be thus selected for use in transparencies.

In another feature of the present invention there are provided emulsion aggregated toners with excellent high intensity color resolutions, and which toners possess high light transmission allowing about 80 to about 95 percent of the transmitted light passing through a fused image on a transparency to reach the screen from an overhead projector.

Also, in a further feature of the present invention there is provided a process for the preparation of toner compositions with a volume average diameter of from about 1 to about 20 microns, and more specifically, from about 2 to about 12 microns, and a particle size distribution of about 1.10 to about 1.35, and yet more specifically, from about 1.15 to about 1.25 as measured by a Coulter Counter without the need to resort to conventional classifications to narrow the toner particle size distribution, and wherein there are selected encapsulated colorants.

Moreover, in another feature of the present invention there are provided simple and economical processes for the direct preparation of a wide range of colored toner compositions with, for example, excellent projection efficiency and narrow GSD.

Other features disclosed herein are the provision of a toner which eliminates the need for flushed pigments; providing a toner wherein the pigment particles can be dispersed in situ in a manner that renders them less prone to migrate out of the toner; a process for obtaining a full process color set of four xerographic color toners wherein the four toners are comprised of a cyan toner, a magenta toner, a yellow toner, and a black toner wherein the difference in tribocharging among the different four color toners is, for example, less than about 10 $\mu$C/gram, and preferably less than about 5 $\mu$C/gram, such as from 1 to about 4; and a process for obtaining a toner with excellent humidity resistant toner properties, such as the ratio of A-zone charge to C-zone charge of about 0.25 to about 0.6, and more specifically, from about 0.4 to about 0.6 wherein A-zone is at 80 percent relative humidity, and C-zone is at 20 percent relative humidity; simple and economical processes for the preparation of black and colored toner compositions with excellent colorant dispersions, thus enabling the achievement of excellent color print quality providing similar toner charging behavior despite differential colorant chemistry; a process capable of delivering differing toner morphology particles, such as toners of a spherical shape, and also it is a feature of the present invention to provide colorants with a solubility in grams per 100 milliliters, which colorant without an attached hydrophilic organic group is relatively highly water insoluble to the extent that in water it possesses a solubility of less than about 1 grams, preferably less than about $10^{-4}$ grams, and more preferably from about $10^{-6}$ grams to about $10^{-4}$ grams per liter of water; wherein the colorant without an attached hydrophilic organic is less water dispersible, that is the colorant possesses a dispersibility of, for example, less than about 1 gram, preferably less than about 0.1 gram, and more preferably from about 0.01 gram to about 0.1 gram per liter of water; wherein the colorant with an attached hydrophilic organic group can provide a colorant with increased water dispersibility, that is the colorant possesses, for example, a dispersibility of greater than about 1 gram, more specifically, greater than about 10 grams, and yet more specifically, from about 10 grams to about 500 grams per liter of water; a substantially surfactant free toner processes, thereby avoiding or minimizing a number of problems relating to overdispersed particles, filter blinding, undesirable toner product characteristics, such as RH sensitivity, low tribo charge, dielectric loss, toner aging and decreased toner flow.

Illustrated herein are toner processes, and more specifically, a process for the preparation of electrophotographic toner comprising (i) generating a latex emulsion of resin, water, an ionic surfactant, and a colorant dispersion of a surface modified colorant, and water, and wherein (ii) the latex emulsion is blended with the colorant dispersion followed by optionally adding a wax dispersion comprised of submicron particles in a size diameter of, for example, about 0.1 to about 0.9 micron;

(iii) heating the resulting mixture below or equal to about the glass transition temperature (Tg) of the latex resin to form toner sized aggregates;

(iv) heating the resulting aggregate suspension of (iii) above the Tg of the latex resin;

(v) optionally retaining the resulting mixture (iv) at a temperature of from about 70° C. to about 95° C. for a period of about 3 to about 8 hours to further initiate the fusion or coalescence of the toner aggregates;

(vi) optionally washing the resulting toner slurry; and (vii) isolating the toner; followed by drying the toner particles; a process wherein there is added to the formed toner aggregates a second latex comprised of submicron resin particles suspended in an aqueous phase containing an ionic surfactant, and wherein the second latex is optionally selected in an amount of about 10 to about 40 percent by weight of the initial latex (i) to form a shell or coating on the aggregates; a process wherein the added latex contains the same resin as the initial latex of (i), or wherein the added latex contains a dissimilar resin than that of the initial latex (i); a process wherein the aggregation is accomplished by heating at a temperature below the glass transition temperature of the polymer contained in the latex, and the fusing or coalescence is accomplished by heating at a temperature above the glass transition temperature of the polymer contained in the latex; a process wherein the aggregation temperature is from about 40° C. to about 60° C., and the coalescence temperature is from about 75° C. to about 97° C.; a process wherein the temperature at which the aggregation is accomplished controls the size of the aggregates, isolating the toner is accomplished, and wherein the final toner size is from about 2 to about 20 microns in volume average diameter; a process wherein the colorant is a pigment, and wherein the pigment is in the form of dispersion, and which dispersion water and a surface modified colorant; a process wherein the latex contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methylacrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly(styrene-butyl acrylate-acrylononitrile-acrylic acid); a process wherein the colorant is carbon black, cyan, yellow, magenta, red, green, blue, or mixtures thereof; the toner isolated is from about 2 to about 15 microns in volume average diameter, and the particle size distribution thereof is from about 1.15 to about 1.30; and wherein there is added to the surface of the formed toner metal salts, metal salts of fatty acids, silicas, metal oxides, or mixtures thereof, each in an amount of from about 0.1 to about 10 weight percent of the obtained toner; a process wherein the latex and the colorant contain water; a process wherein the aggregation heating is below the latex resin glass transition temperature, and the coalescence heating is above the resin latex glass transition temperature; a toner process comprising (i) blending a colorant dispersion of a surface modified colorant, and water with a latex emulsion comprised of resin, water, and an ionic surfactant; optionally adding to the resulting blend containing the latex and colorant a coagulant of polyaluminum chloride with an opposite polarity to that of the surfactant latex to thereby initiate flocculation of the resin latex and colorant; heating the resulting mixture below about the glass transition temperature (Tg) of the latex resin to form toner aggregates; adding a second latex comprised of resin particles suspended in an aqueous phase to the formed toner aggregates resulting in a coating or a shell wherein the shell is optionally of from about 0.1 to about 1 micron in thickness; heating the resulting aggregate suspension above about the Tg glass transition temperature of the latex resin; and isolating the toner; a process wherein during (ii) there is added a wax dispersion comprised of submicron particles in the optional size diameter of about 0.1 to about 0.4 micron dispersed in an anionic surfactant of the same charge polarity as that of the ionic surfactant in the latex emulsion; toner process comprising mixing a latex with a surface modified colorant wherein the latex contains resin and an ionic surfactant, and the colorant is comprised of a water dispersion of the surface modified colorant; affecting aggregation by heating; heating the resulting mixture to accomplish coalescence; and a process wherein the latex can be prepared by batch polymerization or a semi-batch polymerization process containing submicron resin particles suspended in an aqueous phase of surfactants followed by aggregation with submicron pigment particles; a process wherein there are provided toner compositions with low fusing temperatures of from about 140° C. to about 185° C., and which toner compositions exhibit excellent blocking characteristics at and above about, or equal to about 45° C., and generate excellent print quality and high resolution color prints; a process wherein there are provided toner compositions which provide high image projection efficiency, such as for example over 75 percent as measured by the Match Scan II spectrophotometer available from Million-Roy; a process wherein there is added to the formed toner aggregates a second latex comprised of submicron resin particles suspended in an aqueous phase containing an ionic surfactant, and wherein the second latex is selected in an amount of about 10 to about 40 percent by weight of the initial latex to form a shell on the aggregates; a process wherein the temperature at which the aggregation is accomplished controls the size of the aggregates, and wherein the final toner size is from about 2 to about 15 microns in volume average diameter; a process wherein the aggregation (iv) temperature is from about 45° C. (degrees Centigrade throughout) to about 55° C., and wherein the coalescence or fusion temperature is from about 85° C. to about 95° C.; a process wherein the colorant is a pigment, and wherein the pigment is in the form of dispersion, and which dispersion is free of surfactants; a process wherein the latex contains submicron polymer or resin particles containing a polymer selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), and poly(alkyl acrylate-acrylonitrile-acrylic acid); a process wherein the latex contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), and poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylononitrile-acrylic acid); and other similar polymers or other similar known polymers; and wherein the colorant is a pigment; a process wherein the colorant is carbon black, cyan, yellow, magenta, red, green, brown, violet, or mixtures thereof; a process for the preparation of toner particles wherein there is selected a latex comprised of submicron resin particles, which are of a diameter size of about 0.05 to about 0.9 micron, and more specifically, of about 0.07 to about 0.35 micron suspended in an aqueous water phase containing an ionic surfactant selected in an amount of, for example, about 0.5 to about 5 percent, and preferably about 0.7 to about 2 percent by weight of solids, to which is added a surface modified colorant dispersion comprising submicron, for example less than, or equal to about 0.5 micron, colorant particles, aggregating by stirring and heating from about 5 to about 10 degrees below the resin Tg resulting in toner aggregates of a size of about 3 to about 15 microns or about 4 to about 8 microns with a narrow GSD of, for example, about 1.14 to about 1.28 and more specifically, about 1.17 to about 1.25, further stirring and increasing the mixture temperature above the resin Tg of about 70° C. to about 95° C., and more specifically, of about 85° C. to about 93° C. for a period of about 0.5 to about 1.5 hours, and heating the mixture for an additional about 0.5 to about 4 hours, and more specifically, from about 0.6 to about 3 hours, to fuse or coalesce the aggregates, and then washing and drying the toner.

The present invention also permits generating acceptable stable toner triboelectrical toner values with minimum toner washings; and a process for the preparation of toner compositions with a volume average diameter of from between about 1 to about 25 microns, and preferably from about 2 to about 12 microns, and a particle size distribution of about 1.10 to about 1.28, and preferably from about 1.15 to about 1.25, each as measured by a Coulter Counter without the need to resort to conventional classifications to narrow the toner particle size distribution.

The particle size of the toner provided by the processes of the present invention in embodiments can be controlled, for example, by the temperature at which the aggregation of latex, surface modified colorant, such as pigment, and optional additives is conducted. In general, the lower the aggregation temperature, the smaller the aggregate size, and thus the final toner size. For a latex polymer with a glass transition temperature (Tg) of about 55° C. and a reaction mixture with a solids content of about 14 percent by weight, an aggregate size of about 7 microns in volume average diameter is obtained at an aggregation temperature of about 53° C.; the same latex will provide an aggregate size of about 5 microns at a temperature of about 48° C. under similar conditions.

Surface modified colorant refers, for example, to a colorant containing at least one hydrophilic group of, for example, a carboxylic acid, a sulfonic acid, a sulfophenyl, a carboxy phenyl, a sulfonamide, mixtures thereof and the like, such as formic acid, acetic acid, propionic acid, butyric acid, valeric acid, caproic acid, caprylic acid, capric acid, lauric acid, myristic acid, palmitic acid, stearic acid, oxalic acid, malonic acid, succinic acid, glutaric acid, adipic acid, maleic acid, fumaric acid, chloroacetic acid, and chloropropanoic acid; a sulfonic acid, such as methanesulfonic acid, ethanesulfonic acid, propanesulfonic acid, pyridinesulfonic acid, chloroethanesulfonic acid, and bromoethanesulfonic acid; a sulfophenyl, such as benzenesulfonic acid, chlorobenzenesulfonic acid, bromobenzenesulfonic acid, toluenesulfonic acid, and sulfamilic acid; a carboxphenyl, such as benzoic acid, toluic acid, chlorobenzenoic acid, nitrobenzoic acid, naphthoic acid, anthranilic acid, and phthalic acid; a sulfonamide, such as methyl sulfonamide, ethyl sulfonamide, sulfacetamide, sulfadizine, sulfathizole, succinoysulfathizole, and sulfapyridine, or mixtures thereof. The surface-modified colorant can be prepared by reacting a colorant with a diazonium salt in a liquid reaction medium to thereby attach the organic group or groups to the surface of the colorant. The diazonium salt, which is an organic compound having one or more diazonium groups, contains the organic group to be attached to the colorant. Generally, the amount of diazonium salt is from about 1 to about 50, and more specifically, from about 5 to about 30 weight percent based on the amount of colorant used. The reaction process was carried out in a protic medium, such as water or alcohol, at a pH of from about 1 to about 8, and preferably from about 2 to about 6. The reaction temperature can be from about −20° C. to about 110° C., and more specifically, from about 20° C. to about 90° C.

Illustrative examples of specific latex for resin, polymer or polymers selected for the process of the present invention and present in the latex include known polymers, such as poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly (butyl acrylate-butadiene), poly(styrene-isoprene), poly (methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-butylacrylate), poly (styrene-butadiene), poly(styrene-isoprene), poly(styrene-butyl methacrylate), poly(styrene-butyl acrylate-acrylic acid), poly(styrene-butadiene-acrylic acid), poly(styrene-isoprene-acrylic acid), poly(styrene-butyl methacrylate-acrylic acid), poly(butyl methacrylate-butyl acrylate), poly (butyl methacrylate-acrylic acid), poly(styrene-butyl acrylate-acrylonitrile-acrylic acid), poly(acrylonitrile-butyl acrylate-acrylic acid), and the like. The latex polymer, or resin is generally present in the toner compositions of the present invention in various suitable amounts, such as from about 75 weight percent to about 98, or from about 80 to about 95 weight percent of the toner or of the solids, and the latex size suitable for the processes illustrated herein can be, for example, preferably from about 0.05 micron to about 0.5 micron in volume average diameter as measured by the Brookhaven nanosize particle analyzer. Other sizes and effective amounts of latex polymer may be selected in embodiments. The total of all toner components, such as resin and colorant, is about 100 percent, or about 100 parts.

The polymer selected for the process illustrated herein can be prepared by emulsion polymerization methods, and the monomers utilized in such processes include, for example, styrene, acrylates, methacrylates, butadiene, isoprene, acrylic acid, methacrylic acid, itaconic acid, beta carboxy ethyl acrylate, acrylonitrile, and the like. Known chain transfer agents, for example dodecanethiol, of from, for example, about 0.1 to about 10 percent, or carbon tetrabromide in effective amounts, such as for example from about 0.1 to about 10 percent, can also be utilized to control the molecular weight properties of the polymer when emulsion polymerization is selected. Other processes for obtaining polymer particles of from, for example, about 0.01 micron to about 2 microns in diameter can be selected from polymer microsuspension processes, such as disclosed in U.S. Pat. No. 3,674,736, the disclosure of which is totally incorporated herein by reference; polymer solution microsuspension process, such as disclosed in U.S. Pat. No. 5,290,654, the disclosure of which is totally incorporated herein by reference, mechanical grinding processes, or other known processes. Also, the reactant initiators, chain transfer agents, and the like as disclosed in U.S. Pat. No. 922,437, and many of the Xerox patents mentioned herein, the disclosures of which are totally incorporated herein by reference, can be selected for the processes of the present invention.

Examples of waxes include those as illustrated herein, such as those of the recited copending applications, polypropylenes, polyethylenes, and mixtures thereof commercially available from Allied Chemical and Petrolite Corporation, wax emulsions available from Michaelman Inc. and the Daniels Products Company, EPOLENE N-15™ commercially available from Eastman Chemical Products, Inc., VISCOL 550-P™, a low weight average molecular weight polypropylene available from Sanyo Kasei K. K., and similar materials. The commercially available polyethylenes selected are believed to possess a molecular weight of from about 1,000 to about 1,500, while the commercially available polypropylenes are believed to possess a molecular weight of from about 4,000 to about 5,000. Examples of functionalized waxes are amines, amides, for example AQUA SUPERSLIP 6550™, SUPERSLIP 6530™ available from Micro Powder Inc., fluorinated waxes, for example POLYFLUO 190™, POLYFLUO 200™, POLYFLUO 523XF™, AQUA POLYFLUO 411™, AQUA POLYSILK 19™, POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer emulsion, for example JONCRYL™ 74, 89, 130, 537, and 538, all available from S C Johnson Wax, chlorinated polypropylenes and polyethylenes commercially available from Allied Chemical, Petrolite Corporation and S C Johnson Wax.

Various known colorants, such as pigments, selected for the processes of the present invention and present in the toner in an effective amount of, for example, from about 1 to about 25 percent by weight of toner, and preferably in an amount of from about 3 to about 10 percent by weight, that can be selected include, for example, carbon black like REGAL 330®; magnetites, such as Mobay magnetites MO8029™, MO8060™; Colombian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E. D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E. I. DuPont de Nemours & Company, and the like. Generally, colored pigments that can be selected are cyan, magenta, or yellow pigments, and mixtures thereof. Examples of magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans that may be selected include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, Yellow 180 and Permanent Yellow FGL. Colored magnetites, such as mixtures of MAPICO BLACK™, and cyan components may also be selected as pigments with the process of the present invention, wherein the pigment is about 3 to about 15 weight percent of the toner. Dye examples include known suitable dyes, reference the Color Index, and a number of U.S. patents, such as food dyes, and the like.

Colorants include pigment, dye, mixtures of pigment and dyes, mixtures of pigments, mixtures of dyes, and the like.

Examples of initiators for the latex preparation include water soluble initiators, such as ammonium and potassium persulfates, in suitable amounts, such as from about 0.1 to about 8 percent and more specifically, from about 0.2 to about 5 percent (weight percent). Examples of organic soluble initiators include VAZO™ peroxides, such as VAZO 64™, 2-methyl 2-2'-azobis propanenitrile, VAZO 88™, 2-2'-azobis isobutyramide dehydrate in a suitable amount, such as from about 0.1 to about 8 percent. Examples of chain transfer agents include dodecane thiol, octane thiol, carbon tetrabromide and the like in various suitable amounts, such as an amount of from about 0.1 to about 10 percent and preferably from about 0.2 to about 5 percent by weight of monomer.

Surfactants for the preparation of the latexes can be ionic or nonionic surfactants in effective amounts of, for example, from about 0.01 to about 15, or from about 0.01 to about 5 weight percent of the reaction mixture. Anionic surfactants include sodium dodecylsulfate (SDS), sodium dodecylbenzene sulfonate, sodium dodecyinaphthalene sulfate, dialkyl benzenealkyl, sulfates and sulfonates, abitic acid, available from Aldrich, NEOGEN R™, NEOGEN SC™ obtained from Kao, and the like.

Examples of latex cationic surfactants are dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUA™ available from Alkaril Chemical Company, SANIZOL™ (benzalkonium chloride), available from Kao Chemicals, and the like, in effective amounts of, for example, from about 0.01 percent to about 10 percent by weight. Preferably, the molar ratio of the cationic surfactant used for flocculation to the anionic surfactant used in the latex preparation is from about 0.5 to about 4.

Examples of nonionic surfactants selected in various suitable amounts, such as about 0.1 to about 5 weight percent, are polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™, can be selected.

The toner may also include known charge additives in effective suitable amounts of, for example, from about 0.1 to about 5 weight percent, such as alkyl pyridinium halides, bisulfates, the charge control additives of U.S. Pat. Nos. 3,944,493; 4,007,293; 4,079,014; 4,394,430 and 4,560,635, the disclosures of which are totally incorporated herein by reference, negative charge enhancing additives like aluminum complexes, other known charge additives, and the like.

Surface additives that can be added to the toner compositions after washing or drying include, for example, metal salts, metal salts of fatty acids, colloidal silicas, metal oxides, strontium titanates, mixtures thereof, and the like, which additives are each usually present in an amount of from about 0.1 to about 2 weight percent, reference for example U.S. Pat. Nos. 3,590,000; 3,720,617; 3,655,374 and 3,983,045, the disclosures of which are totally incorporated herein by reference. Preferred additives include zinc stearate and AEROSIL R972® available from Degussa. The coated silicas of U.S. Pat. No. 6,190,815 and U.S. Pat. No. 6,004,714, the disclosures of which are totally incorporated herein by reference, can also be selected in amounts, for example, of from about 0.1 to about 2 percent, which additives can be added during the aggregation or blended into the formed toner product.

Developer compositions can be prepared by mixing the toners obtained with the processes of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration. The carrier particles can also be comprised of a core with a polymer coating thereover, such as polymethylmethacrylate (PMMA), having dispersed therein a conductive component like conductive carbon black. Carrier coatings include silicone resins, fluoropolymers, mixtures of resins not in close proximity in the triboelectric series, thermosetting resins, and other known components. Imaging methods are also envisioned with the toners of the present invention, reference for example a number of the patents mentioned herein, and U.S. Pat. Nos. 4,265,990; 4,858,884; 4,584,253 and 4,563,408, the disclosures of which are totally incorporated herein by reference.

The following Examples and Comparative Examples are provided.

Latex Preparation—Semicontinuous Method

A latex (EA12-52) was prepared by the semicontinuous emulsion polymerization of styrene/butyl acrylate/2-carboxyethyl acrylate, 75/25/6 parts (by weight) as follows. A 2 liter jacketed glass flask with a stirrer set at 200 rpm, and containing 8.8 grams of DOWFAX 2A1™ (sodium tetrapropyl diphenyloxide disulfonate, 47 percent active, available from Dow Chemical), and 519 grams of deionized water was purged with nitrogen for 30 minutes while the temperature was from about 25° C. to about 75° C. A monomer emulsion was prepared by homogenizing a monomer mixture (405 grams of styrene, 135 grams of n-butyl acrylate, 32.4 grams of 2-carboxyethyl acrylate, and 7.1 grams of 1-dodecanethiol) with an aqueous solution (4.4 grams of DOWFAX 2A1™, and 251 grams of deionized water) at 10,000 rpm for 5 minutes at room temperature of about 25° C. via VirTishear Cyclone Homogenizer. Forty one (41) grams of seed were removed from the monomer emulsion and added into the flask, and the flask contents were stirred for 5 minutes at 75° C. An initiator solution prepared from 8.1 grams of ammonium persulfate in 40 grams of deionized water was added to the flask mixture over 20 minutes. Stirring was continued for an additional 20 minutes to allow a seed particle formation. The remaining 792 grams of monomer emulsion were fed continuously into the reactor over 4 hours and 20 minutes. The nitrogen purge was reduced to a slow trickle to maintain a small positive pressure. After the above monomer emulsion addition was completed, the reaction was allowed to post react for 90 minutes at 75° C., then cooled to 25° C. by cool water. The resulting polymer poly(styrene-butyl acrylate-acrylic acid-2-carboxyethyl acrylate) possessed an $M_w$ of 34,300, and an $M_n$ of 9,500, as determined on a Waters GPC, and a mid-point Tg of 51.6° C., as measured on a Seiko DSC. The latex resin or polymer possessed a volume average diameter of 211 nanometers as measured by light scattering technique on a Coulter N4 Plus Particle Sizer. The latex was comprised of 40 percent resin, 58.5 percent water and 1.5 percent of anionic surfactant.

Surface Modified Colorant Preparation

EXAMPLE I

Preparation of Surfactant-Free Cyan Pigment Dispersions:

80 Grams of phthalocyanine blue (Pigment 15.3) were mixed with 16 grams of anthranilic acid. The mixture was added to a flask in a 70° C. water bath. A solution of 7 grams of $NaNO_2$ dissolved in 300 grams of DI (deionized water) water was added to the flask with agitation to form a pigment slurry. The pH of the pigment slurry was adjusted to 2 by the addition of HCl, and then was mixed at 70° C. using a high-speed mixer at 1,500 rpm for 2 hours, then dried in an oven at 70° C. The resulting cyan pigment had attached thereto $o\text{-}C_6H_4COO^-$ groups. The surface modified pigment was extracted using methanol in a Sohxlet extractor for 10 hours to remove reaction byproducts and re-dried. This surface modified pigment was added to DI water to form an aqueous dispersion by means of homogenization. The resulted aqueous pigment dispersion had a solid loading of 20 percent by weight of pigment with an average pigment particle diameter size of 228 nanometers.

EXAMPLE II

Preparation of Surfactant-Free Black Pigment Dispersions:

Six grams of anthranilic acid were added to a solution of 40 grams of concentrated HCl in 25 grams of water at 5° C. A solution of 8 grams of $NaNO_2$ in 35 grams of water at 5° C. was added, while retaining the temperature below 10° C. by stirring in an ice bath. After stirring for 30 minutes, the solution was added to a suspension of 80 grams of carbon black (REGAL 330™) in 200 grams of DI water. After mixing for 30 minutes, the pigment slurry was collected by filtration (44 $\mu$m screen), washed twice with DI (deionized) water and dried in an oven at 110° C. The resulting black pigment had attached thereto $o\text{-}C_6H_4COO^-$ groups. This surface modified pigment was added to DI water to form an aqueous dispersion by means of homogenization. The resulting aqueous pigment dispersion had a solid loading of 20 percent by weight of pigment with an average pigment particle size diameter of 138 nanometers.

EXAMPLE III

Preparation of Surfactant-Free Yellow Pigment Dispersions:

85 Grams of Pigment Yellow 74 were mixed with 17 grams of anthranilic acid. The mixture was added to a flask in a 70° C. water bath. A solution of 8 grams of $NaNO_2$ dissolved in 300 grams of DI water was added to the flask with agitation to form a pigment slurry. The pH of the pigment slurry was adjusted to 2 by the addition of concentrated HCl, and then was mixed at 70° C. using a high-speed mixer at 1,500 rpm for 2 hours, then dried in an oven at 70° C. The resulting cyan pigment has attached thereto $o\text{-}C_6H_4COO^-$ groups. The resulting surface modified pigment was extracted using methanol in a Sohxlet extractor for 12 hours to remove reaction byproducts and re-dried. This surface modified pigment was added to DI water to form an aqueous dispersion by means of homogenization. The resulting aqueous pigment dispersion had a solid loading of 20 percent by weight of pigment with an average diameter particle size of 197 nanometers.

EXAMPLE IV

Preparation of Surfactant-Free Magenta Pigment Dispersions:

90 Grams of Pigment Red PR122 were mixed with 19 grams of anthranilic acid. The mixture was added to a flask in a 70° C. water bath. A solution of 10 grams of $NaNO_2$ dissolved in 340 grams of DI water was added to the flask with agitation to form a pigment slurry. The pH of the pigment slurry was adjusted to 2.4 by adding HCl, and then was mixed at 70° C. using a high-speed mixer at 1,500 rpm for 2 hours, then dried in an oven at 70° C. The resulting cyan pigment has attached thereto $o\text{-}C_6H_4COO^-$ groups. The surface modified pigment was extracted using methanol in a Sohxlet extractor for 12 hours to remove reaction byproducts and re-dried. This surface modified pigment was added to DI water to form an aqueous dispersion by means of homogenization. The resulting aqueous pigment dispersion had a solid loading of 20 percent by weight of pigment and an average particle size diameter of 173 nanometers.

Toner Preparation

EXAMPLE V 5.5 Micron Cyan Toner Particles by PAC Emulsion/Aggregation/Coalescence Process:

The surfactant-free cyan pigment dispersion of Example I above was utilized in an aggregation/coalescence process to produce 5.5 micron toner particles with a narrow size distribution.

500 Grams of deionized water were placed in a stainless steel beaker and homogenized at 5,000 rpm, while 300 grams of the above prepared latex EA12-52 were added, followed by the addition of 31.6 grams of the surfactant-free cyan pigment dispersion of Example I diluted with 110 grams of deionized water. To the resulting homogenized latex/pigment blend, 2.4 grams of 10 percent PAC (polyaluminum chloride obtained from Asada Company of Japan), solution diluted with 24 grams of 0.02N $HNO_3$ were added dropwise to cause a flocculation of the cyan pigment, 5 percent by weight, the resin, 94.8 weight percent, and 0.2 weight percent of the PAC. After the addition was complete, homogenization was continued for additional 2 minutes to form a creamy blend with an average particle diameter size by volume of 2.73, and a GSD of 1.22. The creamy blend was then transferred into a 2 liter glass reactor and stirred at 350 rpm, while being heated to about 52° C. to about 53° C. Particle growth was monitored during heating. When the particle size by volume was equal to 5.41 (GSD=1.21), the pH of the slurry was adjusted to 7.5 by the addition of 2 percent NaOH and the speed in the reactor was reduced to 200 rpm. After ½ hour of stirring at 53° C., the temperature in the reactor was raised to 95° C. After 1 hour of heating at 95° C., the pH of the slurry was adjusted to 4.3 and the heating was continued for an additional 5 hours. Subsequently, the reactor contents were cooled down and discharged. A 16 percent solids slurry of 5.53 micron cyan toner particles with GSD=1.20 was obtained. The resulting toner, that is the above final toner product, was comprised of about 5 percent of cyan pigment PB15:3, about 94.8 percent by weight of poly(styrene-butyl acrylate-2-carboxyethyl acrylate), and about 0.2 percent of PAC, and wherein the total amount of the toner components was about 100 percent. The toner particles were washed three times. After the third wash, there were not any detectable amounts of residual chemicals, including aluminum, copper, chlorides, fluorides, nitrates, sulfates, diols, glycols and alkylarylalkoxylates, from the toner left in the wash water. To detect the residual chemicals, surface tension and pH measurements, liquid chromatography, gas chromatography, ion chromatography and mass spectroscopy were used. The resulting cyan toner possessed a projection efficiency of about 95 percent, as measured by the Match Scan II spectrophotometer available from Milton-Roy.

Toner Triboelectric Charge Evaluation:

In separate 120 milliliter glass bottles, 1 gram of the above prepared cyan toner was added to 24 grams of carrier particles comprised of 90 micron diameter ferrite core, spray coated with 0.5 weight percent of a terpolymer of poly (methyl methacrylate), styrene, and vinyltriethoxysilane with a coating weight of 1 percent. For each combination of toner and carrier, the above developer mixture was retained in an environmental chamber at either 20 percent relative humidity, 50 percent relative humidity, or 80 percent relative humidity overnight, about 16 hours. The bottles were then sealed, and the toner and carrier particles were mixed by roll milling for 30 minutes to obtain a stable triboelectric charge. The toner charge was measured using the standard Faraday Cage tribo blow-off apparatus. Triboelectric charge evaluation indicated that the cyan toner of this Example had a toner tribo of −25 $\mu$C/gram (microcoulombs per gram) at 20 percent relative humidity (C-zone), and a minus −12.2 $\mu$C/gram at 80 percent relative humidity (A-zone). This toner had a ratio of A-zone charge to C-zone charge of about 0.49.

EXAMPLE VI 5.5 Micron Black Toner Particles by PAC A/C Process:

The surfactant-free black pigment dispersion of Example II above is utilized in an aggregation/coalescence process to produce 5.5 micron particles with a narrow size distribution.

500 Grams of deionized water are placed in a stainless steel beaker and homogenized at 5,000 rpm, while 300 grams of latex EA12-52 are added, followed by the addition of 38.3 grams of the surfactant-free black pigment dispersion of Example II diluted with 110 grams of deionized water. To this homogenized latex/pigment blend, 2.4 grams of 10 percent PAC solution diluted with 24 grams of 0.02N $HNO_3$ are added dropwise to cause a flocculation of the black pigment REGAL 330™ carbon black pigment, 6 percent by weight, the resin, 93.8 weight percent, and 0.2 weight percent of the PAC. After the addition is complete, homogenization is continued for additional 2 minutes to form a creamy blend with an average particle size by volume of 2.67 and with a GSD of 1.21. The creamy blend is then transferred into a 2 liter glass reactor and stirred at 350 rpm, while being heated to about 52° C. to about 53° C. Particle growth is monitored during heating. When the particle size diameter by volume is equal to 5.34 (GSD=1.20), the pH of the slurry is adjusted to 7.5 by the addition of 2 percent NaOH and the speed in the reactor is reduced to 200 rpm.

After ½ hour of stirring at 53° C., the temperature in the reactor is raised to 95° C. After 1 hour of heating at 95° C., the pH of the slurry is adjusted to 4.3 and the heating is continued for an additional 5 hours. Thereafter, the reactor content is cooled down to about room temperature throughout the Examples, about 23° C. to about 25° C., and is discharged. A 16 percent solids slurry of 5.52 micron black toner particles with GSD=1.19 is obtained. The resulting toner, that is the above final toner product, is comprised of about 6 percent of black pigment REGAL 330™, about 0.2 weight percent of PAC and about 93.8 percent by weight of the above resin poly(styrene-butyl acrylate-2-carboxyethyl acrylate), and wherein the total amount of the toner components is about 100 percent. The toner particles are washed three times. After the third wash, there are not any detectable amounts of any residual chemicals, including aluminum, copper, chlorides, fluorides, nitrates, sulfates, diols, glycols and alkylarylalkoxylates, from the toner left in the wash water. To detect the residual chemicals, surface tension and pH measurements, liquid chromatography, gas chromatography, ion chromatography and mass spectroscopy are used. The resulting black toner possessed a projection efficiency of about 93 percent, as measured by the Match Scan II spectrophotometer available from Milton-Roy. Triboelectric charge evaluation indicated that the black toner of this Example had a toner tribo of −20.3 $\mu$C/gram (microcoulombs per gram) at 20 percent relative humidity, and −8.4 $\mu$C/gram at 80 percent relative humidity. This toner has a ratio of A-zone charge to C-zone charge of about 0.41.

EXAMPLE VII 5.5 Micron Yellow Toner Particles by PAC A/C Process:

The surfactant-free yellow pigment dispersion of Example III above is utilized in an aggregation/coalescence process to produce 5.5 micron particles with a narrow size distribution.

500 Grams of deionized water are placed in a stainless steel beaker and homogenized at 5,000 rpm, while 300 grams of the above generated latex EA12-52 are added, followed by the addition of 39 grams of the surfactant-free yellow pigment dispersion of Example III diluted with 110 grams of deionized water. To this homogenized latex/pigment blend, 2.4 grams of a 10 percent PAC solution diluted with 24 grams of 0.02N $HNO_3$ are added dropwise to cause a flocculation of the latex resin, the colorant, and the PAC. After the addition is complete, homogenization is continued for additional 2 minutes to form a creamy blend with an average particle diameter size by volume of 2.78, and a GSD of 1.20. The creamy blend is then transferred into a 2 liter glass reactor and stirred at 350 rpm, while being heated to about 52° C. to about 53° C. Particle growth is monitored during heating. When the particle size by volume is equal to 5.29 (GSD=1.20), the pH of the slurry is adjusted to 7.5 by the addition of 2 percent NaOH and the speed in the reactor is reduced to 200 rpm. After ½ hour of stirring at 53° C., the temperature in the reactor is raised to 95° C. Subsequent to 1 hour of heating at 95° C., the pH of the slurry is adjusted to 4.3 and the heating is continued for an additional 5 hours. Subsequently, the reactor contents are cooled down to room temperature and the contents are discharged. A 16 percent solids slurry of 5.48 micron yellow toner particles with GSD=1.19 is obtained. The resulting toner, that is the above final toner product, is comprised of about 6 percent of Yellow pigment PY74, about 93.8 percent by weight of the above latex resin poly(styrene-butyl acrylate-2-carboxyethyl acrylate), and 0.2 weight percent of PAC, and wherein the total amount of the toner components is about 100 percent. The toner particles are washed three times. After the third wash, there are no detectable amounts in the toner of any residual chemicals, including aluminum, copper, chlorides, fluorides, nitrates, sulfates, diols, glycols and alkylarylalkoxylates. To detect the residual chemicals, there is used surface tension and pH measurements, liquid chromatography, gas chromatography, ion chromatography and mass spectroscopy are used. The resulting yellow toner possessed a projection efficiency of about 86 percent, as measured by the Match Scan II spectrophotometer available from Milton-Roy. Triboelectric charge evaluation indicated that the yellow toner of this Example had a toner tribo of −22.5 µC/gram (microcoulombs per gram) at 20 percent relative humidity, and −11.3 µC/gram at 80 percent relative humidity. This toner has a ratio of A-zone charge to C-zone charge of about 0.47.

EXAMPLE VIII
5.5 Micron Magenta Toner Particles by PAC A/C Process:

The surfactant-free magenta pigment dispersion of Example IV above is utilized in an aggregation/coalescence process to produce 5.5 micron particles with a narrow size distribution.

500 Grams of deionized water are placed in a stainless steel beaker and homogenized at 5,000 rpm, while 300 grams of latex EA12-52 are added, followed by the addition of 54 grams of the surfactant-free magenta pigment dispersion of Example IV diluted with 110 grams of deionized water. To this homogenized latex/pigment blend, 2.4 grams of 10 percent PAC solution diluted with 24 grams of 0.02N $HNO_3$ are added dropwise to cause a flocculation of the above latex resin, the above pigment and the PAC. After the addition is complete, homogenization is continued for additional 2 minutes to form a creamy blend with an average particle diameter size by volume of 2.83, and a GSD of 1.24. The creamy blend is then transferred into a 2 liter glass reactor and stirred at 350 rpm, while being heated to about 52° C. to about 53° C. Particle growth is monitored during heating. When the particle size by volume is equal to 5.41 (GSD=1.22), the pH of the slurry is adjusted to 7.5 by the addition of 2 percent NaOH and the speed in the reactor is reduced to 200 rpm. After ½ hour of stirring at 53° C., the temperature in the reactor is increased to 95° C. After 1 hour of heating at 95° C., the pH of the slurry is adjusted to 4.3 and the heating is continued for an additional 5 hours. Thereafter, the reactor contents are cooled down to room temperature, about 22° C. to about 25° C. throughout the Examples, and is discharged. A 16 percent solids slurry of 5.56 micron yellow toner particles with GSD=1.22 is obtained. The resulting toner, that is the above final toner product, is comprised of about 8 percent of Magenta pigment PR122, about 91.8 percent by weight of poly(styrene-butyl acrylate-2-carboxyethyl acrylate), and 0.2 weight percent of PAC, and wherein the total amount of the toner components is about 100 percent. The toner particles are washed three times. After the third wash, there are not any detectable amounts of any residual chemicals, including aluminum, copper, chlorides, fluorides, nitrates, sulfates, diols, glycols and alkylarylalkoxylates, from the toner left in the wash water. To detect the residual chemicals, surface tension and pH measurements, liquid chromatography, gas chromatography, ion chromatography and mass spectroscopy are used. The resulting magenta toner possessed a projection efficiency of about 92 percent, as measured by the Match Scan II spectrophotometer available from Milton-Roy. Triboelectric charge evaluation indicated that the yellow toner of this Example has a toner tribo of −21.8 µC/gram (microcoulombs per gram) at 20 percent relative humidity, and −12.1 µC/gram at 80 percent relative humidity. This toner has a ratio of A-zone charge to C-zone charge of about 0.56.

Other embodiments and modifications of the present invention may occur to those skilled in the art subsequent to a review of the information presented herein; these embodiments and modifications, equivalents thereof, substantial equivalents thereof, or similar equivalents thereof are also included within the scope of this invention.

What is claimed is:

1. A process for the preparation of toner comprising generating a latex emulsion of resin, water, and an ionic surfactant, and a colorant dispersion of a surface modified colorant and water, and wherein the latex emulsion is blended with the surface modified colorant dispersion; heating the resulting mixture below or equal to about the glass transition temperature (Tg) of the latex resin to form aggregates; optionally adding a second latex comprised of submicron resin particles suspended in an aqueous phase resulting in a shell or coating wherein the shell is optionally of from about 0.1 to about 1 micron in thickness, and wherein optionally the shell coating is contained on 100 percent of the aggregates; heating the resulting aggregate suspension above about the Tg of the latex resin; and optionally isolating the toner.

2. A process in accordance with claim 1 wherein said colorant contains at least one hydrophilic group.

3. A process in accordance with 2 wherein said hydrophilic group is a carboxylic acid or salt thereof, a sulfonic acid or salt thereof, a sulfophenyl or salt thereof, a carboxy phenyl or salt thereof, or a sulfonamide or salt thereof, and mixtures thereof.

4. A process in accordance with 2 wherein said hydrophilic group is a carboxylic acid or salt thereof.

5. A process in accordance with claim 4 wherein said carboxylic acid is acetic acid, or succinic acid.

6. A process in accordance with claim 4 wherein said carboxylic acid is formic acid, acetic acid, propionic acid, or lauric acid.

7. A process in accordance with 2 wherein said hydrophilic group is a sulfonic acid or salt thereof.

8. A process in accordance with 2 wherein said hydrophilic group is a sulfophenyl or salt thereof.

9. A process in accordance with claim 8 wherein said hydrophilic group is benzenesulfonic acid, chlorobenzenesulfonic acid, bromobenzenesulfonic acid, toluenesulfonic acid, or sulfamilic acid.

10. A process in accordance with 2 wherein said hydrophilic group is a carboxy phenyl or salt thereof.

11. A process in accordance with claim 10 wherein said hydrophilic group is benzoic acid, toluic acid, naphthoic acid, anthranilic acid, or phthalic acid.

12. A process in accordance with 2 wherein said hydrophilic group is a sulfonamide or salt thereof.

13. A process in accordance with claim 12 wherein said hydrophilic group methyl sulfonamide, ethyl sulfonamide, sulfacetamide, sulfadizine, or sulfapyridine.

14. A process in accordance with 2 wherein the hydrophilic group is carboxyphenylic acid.

15. A process in accordance with 2 wherein the colorant is carbon black and the hydrophilic group is carboxyphenylic acid.

16. A process in accordance with 2 wherein the colorant is red, and the hydrophilic group is sulfophenylic acid.

17. A process in accordance with 2 wherein the hydrophilic group is sulfoamide.

18. A process in accordance with 2 wherein said hydrophilic group is a sulfonic acid of methanesulfonic acid, ethanesulfonic acid, propanesulfonic acid, or chloroethanesulfonic acid.

19. A process in accordance with claim 1 wherein said colorant contains from about 1 to about 6 hydrophilic groups.

20. A process in accordance with claim 1 wherein said colorant contains one hydrophilic group.

21. A process in accordance with claim 1 wherein there is added to the formed toner aggregates a second latex comprised of submicron resin particles suspended in an aqueous phase containing an ionic surfactant, and wherein said second latex is optionally selected in an amount of about 10 to about 40 percent by weight of the initial latex (i) to form a shell or coating on said aggregates.

22. A process in accordance with claim 21 wherein the added second latex resin forms a shell on said aggregates of (v) wherein the thickness of the formed shell is from about 0.1 to about 1 micron.

23. A process in accordance with claim 21 wherein the added latex contains the same resin as the initial latex of (l), or wherein said added latex contains a dissimilar resin than that of the initial latex (l).

24. A process in accordance with claim 1 wherein the aggregation (iv) is accomplished by heating at a temperature below the glass transition temperature of the polymer contained in the latex, and the coalescence is accomplished by heating at a temperature above the glass transition temperature of the polymer contained in the latex.

25. A process in accordance with claim 24 wherein said aggregation temperature is from about 40° C. to about 60° C., and said coalescence temperature is from about 75° C. to about 97°C.

26. A process in accordance with claim 1 wherein said surface-modified colorant is generated by reacting said colorant with a diazonium salt in a liquid reaction medium.

27. A process in accordance with claim 1 wherein the temperature at which the aggregation is accomplished controls the size of the aggregates isolating the toner is accomplished, and wherein the final toner size is from about 2 to about 20 microns in volume average diameter.

28. A process in accordance with claim 1 wherein the colorant is a pigment.

29. A process in accordance with claim 1 wherein the latex contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly (methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly (propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly (styrene-butyl acrylate-acrylonitrile-acrylic acid).

30. A process in accordance with claim 1 wherein the colorant is carbon black, cyan, yellow, magenta, or mixtures thereof; the toner isolated is optionally from about 2 to about 15 microns in volume average diameter, and the particle size distribution thereof is optionally from about 1.15 to about 1.30; and wherein there is added to the surface of the formed toner metal salts, metal salts of fatty acids, silicas, metal oxides, or mixtures thereof, each in an amount of from about 0.1 to about 10 weight percent of the obtained toner.

31. A process in accordance with claim 1 wherein the colorant is black.

32. A process in accordance with claim 1 wherein the colorant is a pigment of magenta, yellow, cyan, black, orange, or mixtures thereof.

33. A process in accordance with claim 1 wherein there is added a wax dispersion comprised of submicron particles in the size diameter of about 0.1 to about 0.7 micron dispersed in an anionic surfactant of the same charge polarity as that of the ionic surfactant in the latex emulsion.

34. A process in accordance with claim 1 wherein said surface-modified colorant is generated by reacting said colorant with a diazonium salt in a liquid reaction medium to thereby attach organic groups to the surface of said colorant, and wherein said diazonium salt contains the organic group to be attached to the colorant; wherein the reaction is accomplished in a protic medium of water or an alcohol at a pH of from about 1 to about 8, and wherein the reaction is accomplished at a temperature of from about −20° C. to about 110° C.

* * * * *